W. BLUME.
EYEGLASSES.
APPLICATION FILED DEC. 5, 1910.

1,014,938.

Patented Jan. 16, 1912.

Witnesses:

Inventor:
Wilhelm Blume

UNITED STATES PATENT OFFICE.

WILHELM BLUME, OF RATHENOW, GERMANY.

EYEGLASSES.

1,014,938.     Specification of Letters Patent.     Patented Jan. 16, 1912.

Application filed December 5, 1910. Serial No. 595,844.

*To all whom it may concern:*

Be it known that I, WILHELM BLUME, a subject of the King of Prussia, and residing at Rathenow, in the Kingdom of Prussia, Germany, have invented certain new and useful Improvements in Eyeglasses, of which the following is a specification.

This invention relates to eyeglasses the construction of which is improved in such a manner that the elastic frame which carries the glasses can be easily and conveniently opened with one hand only whereby the mounting of the eyeglasses on the nose is greatly facilitated.

In the accompanying drawing the improved eyeglasses are shown by way of example.

Figure 1:
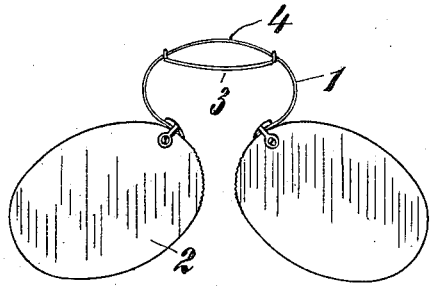
Figure 2:
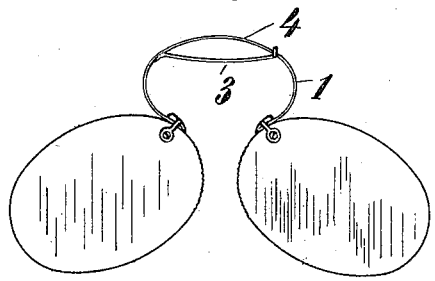
Figure 3:
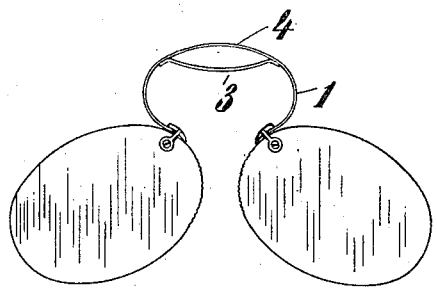
Figure 4:
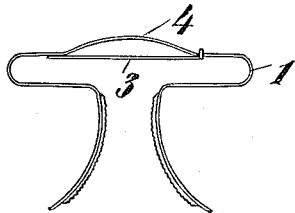

Figures 1, 2 and 3 show in elevation different modifications of an eyeglass with supporting frame improved according to the present invention. Fig. 4 represents the supporting frame only; this figure is drawn on a larger scale than the Figs. 1, 2 and 3 and to a still further modified construction.

According to this invention a blade spring 3 is connected with the spring bridge 1 which supports the glasses 2. The blade spring 3 can be connected with the spring bridge 1 either as shown in Fig. 1 so that its ends are bent upward and form lugs in which the steel band forming the spring bridge 1 slides when the upper part 4 of said band and the blade spring 3 are being pressed together with two fingers of one hand. Or, as shown in Fig. 2 one end of the blade spring 3 is fixed to the lower surface of the steel band which forms the spring bridge 1, the other end being bent up and forming a lug. According to Fig. 3 both ends of the blade spring 3 are fixed to the lower surface of the steel band which forms the supporting frame for the eyeglasses 2. The blade spring 3 as shown in Figs. 1 to 3 is slightly curved in the opposite direction from the upper part or yoke 4 of the spring bridge 1 and it is of approximately the same length as the said part 4. According to Fig. 4 the blade spring 3 is straight and one of its ends is fixed to the spring bridge 1.

To put the eyeglasses on the nose the person who wants to use the same grips the upper part or yoke 4 of the frame and the blade spring 3 with two fingers of one hand and presses said parts the one against the other. The blade spring 3 in bending forces the ends of the spring bridge 1 which carry the glasses 2 to go away from one another, or otherwise expressed, it forces the spring bridge to open sufficiently to permit of putting the eyeglasses on the nose.

I claim:—

Improved eyeglasses adapted to be put on with one hand only, comprising in combination with the glasses proper and with the usual spring bridge supporting said glasses, a blade spring arranged under the yoke part of said spring bridge, the ends of said blade spring formed to force open the spring bridge when a pressure is being exerted upon the blade spring, substantially as described and shown.

In witness whereof I have hereunto set my hand in the presence of two witnesses.

WILHELM BLUME.

Witnesses:
   HENRY HASPER,
   WOLDEMAR HAUPT.

Copies of this patent may be obtained for five cents each, by addressing the "Commissioner of Patents, Washington, D. C."